United States Patent

Gates

[19]

[11] 4,286,575

[45] Sep. 1, 1981

[54] SOLAR HEAT SYSTEM

[75] Inventor: Timothy P. Gates, Cedar Springs, Mich.

[73] Assignee: Jordan College, Cedar Springs, Mich.

[21] Appl. No.: 966,320

[22] Filed: Dec. 4, 1978

[51] Int. Cl.³ .............................................. F24J 3/02
[52] U.S. Cl. .................................. 126/422; 126/429; 126/430
[58] Field of Search ............... 126/270, 271, 430, 429, 126/428, 422

[56] References Cited

U.S. PATENT DOCUMENTS

| 4,066,118 | 1/1978 | Goettl ................................. 121/270 |
| 4,129,116 | 12/1978 | Kent ..................................... 126/270 |
| 4,137,898 | 2/1979 | Kouzumi .............................. 126/270 |

4,203,424  5/1980  Coxon et al. .......................... 126/430

Primary Examiner—Albert W. Davis
Assistant Examiner—G. Anderson
Attorney, Agent, or Firm—Price, Heneveld, Huizenga and Cooper

[57] ABSTRACT

A solar air heating system for circulating heated air from a solar collector or a heat storage unit, or both in proportion to heat available from the collector, through a control chamber to an environmental space to be heated, using one blower sized to optimize flow through the duct system to the space. When the space does not require heat, heated air from the collector is propelled via the chamber to the storage unit by a second blower sized to optimize flow from the control chamber to the storage unit.

6 Claims, 7 Drawing Figures

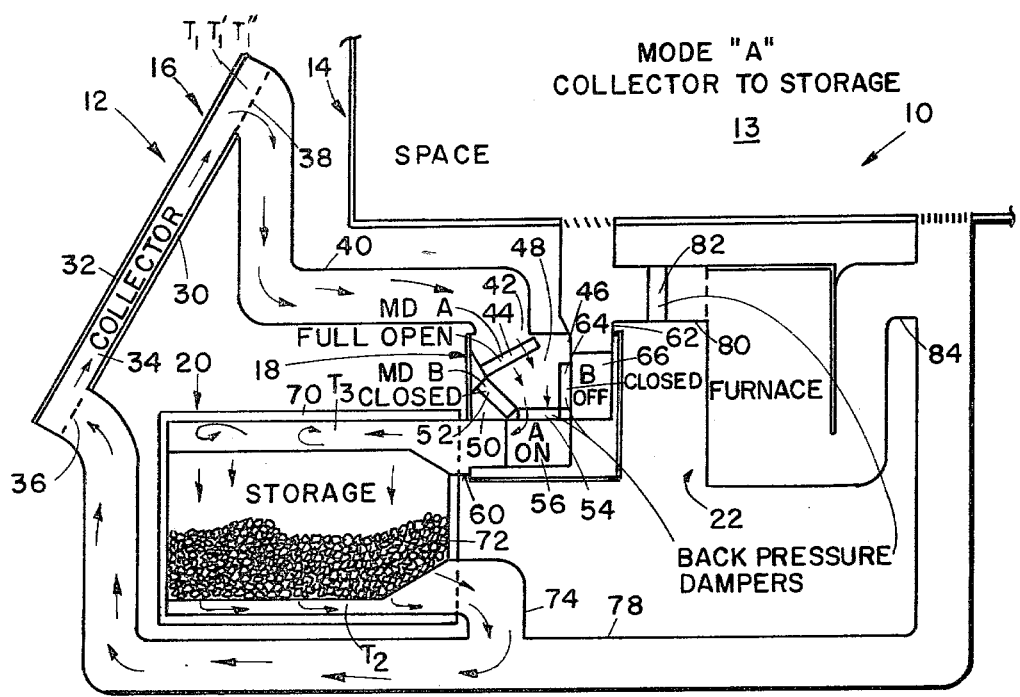
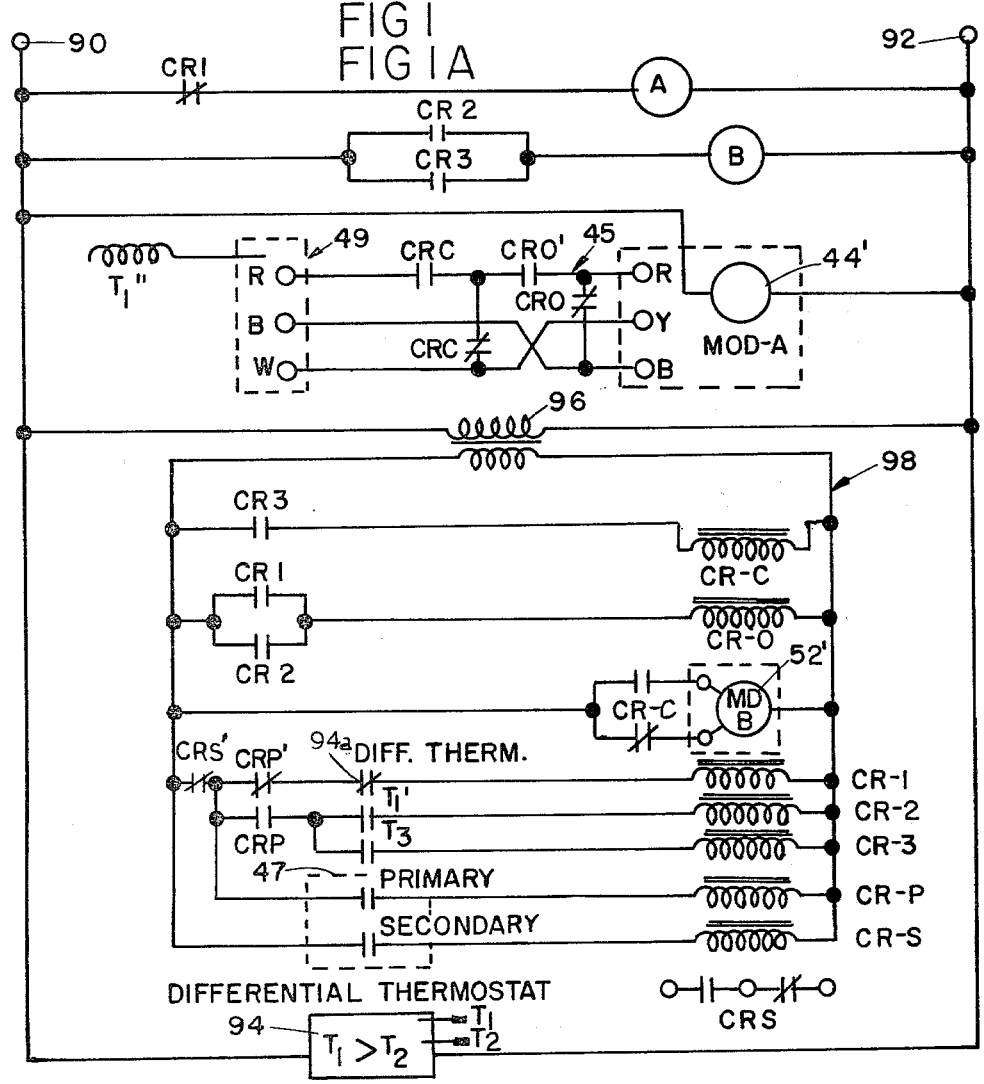
FIG 1
FIG 1A

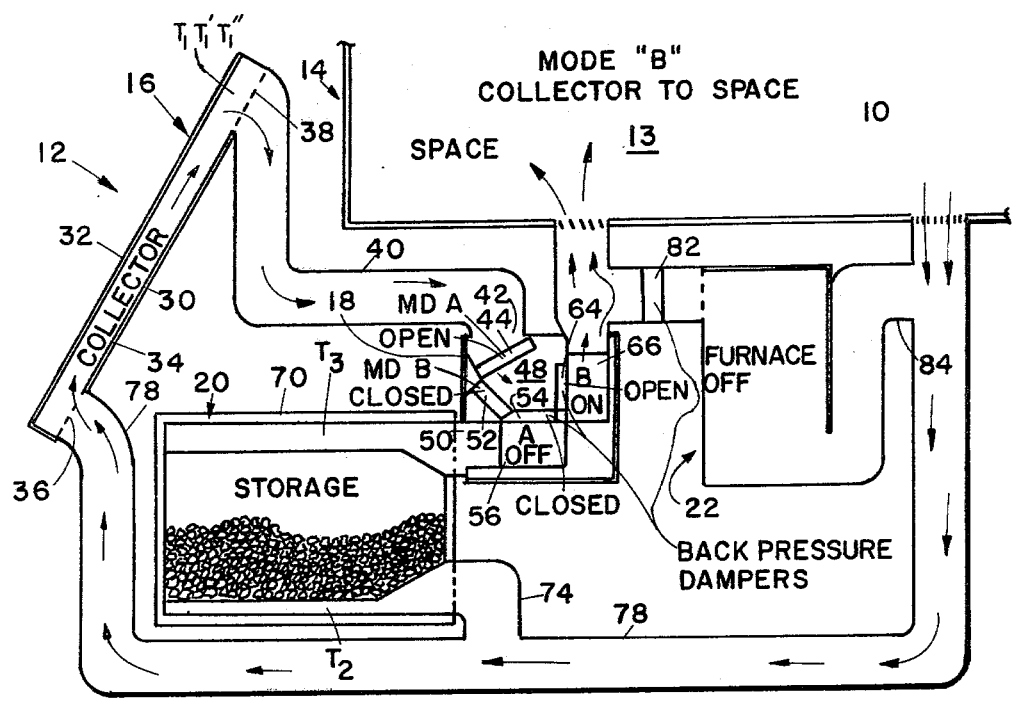
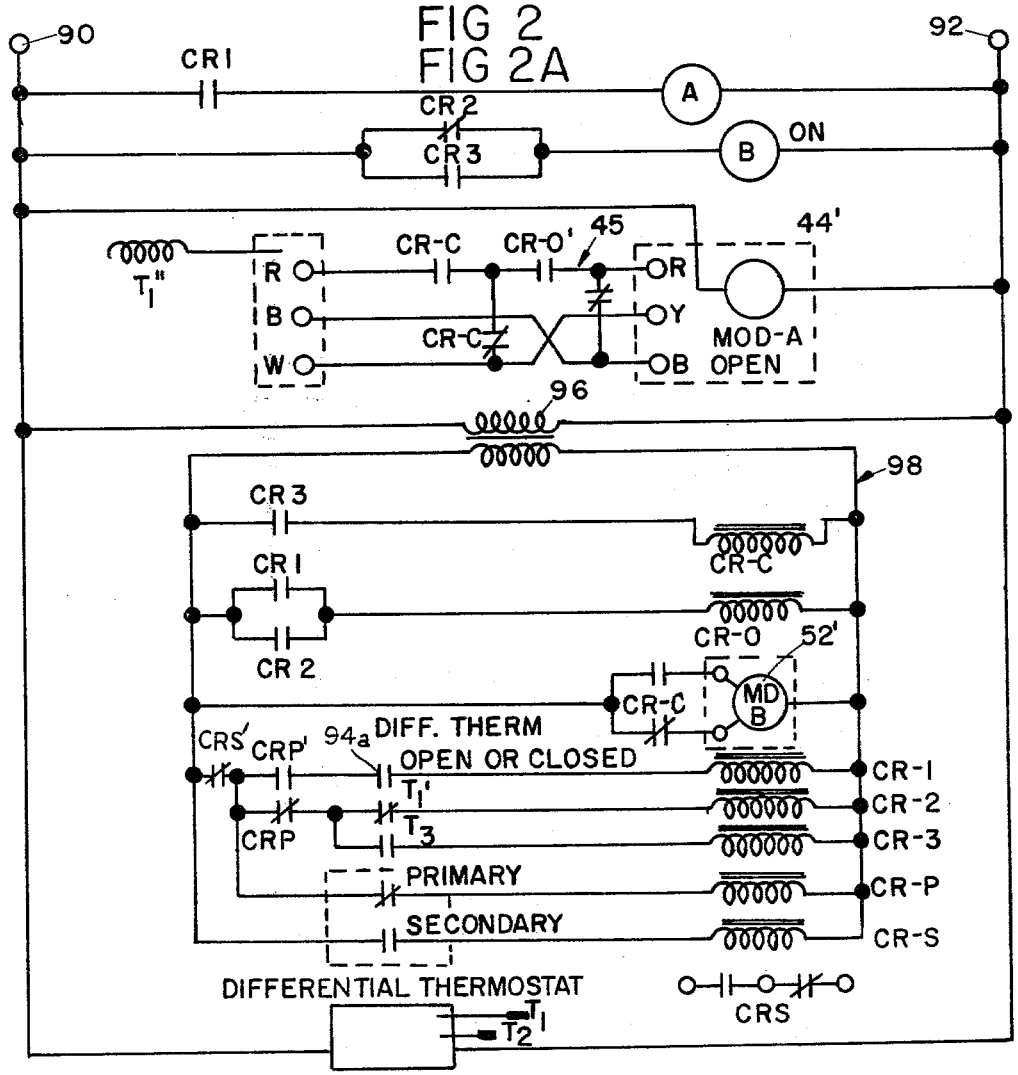

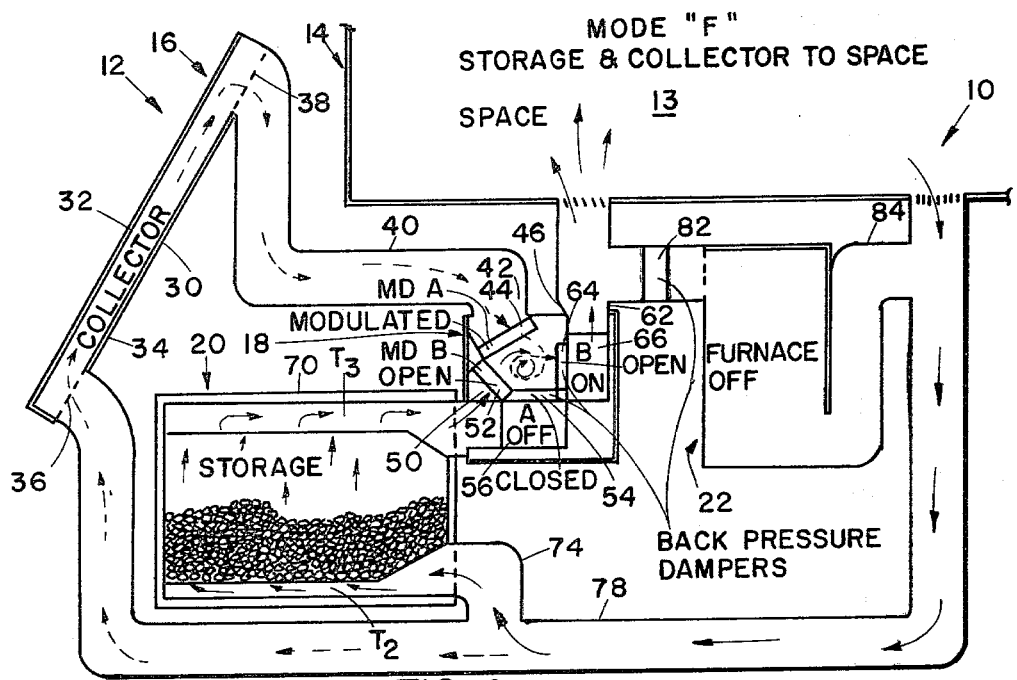
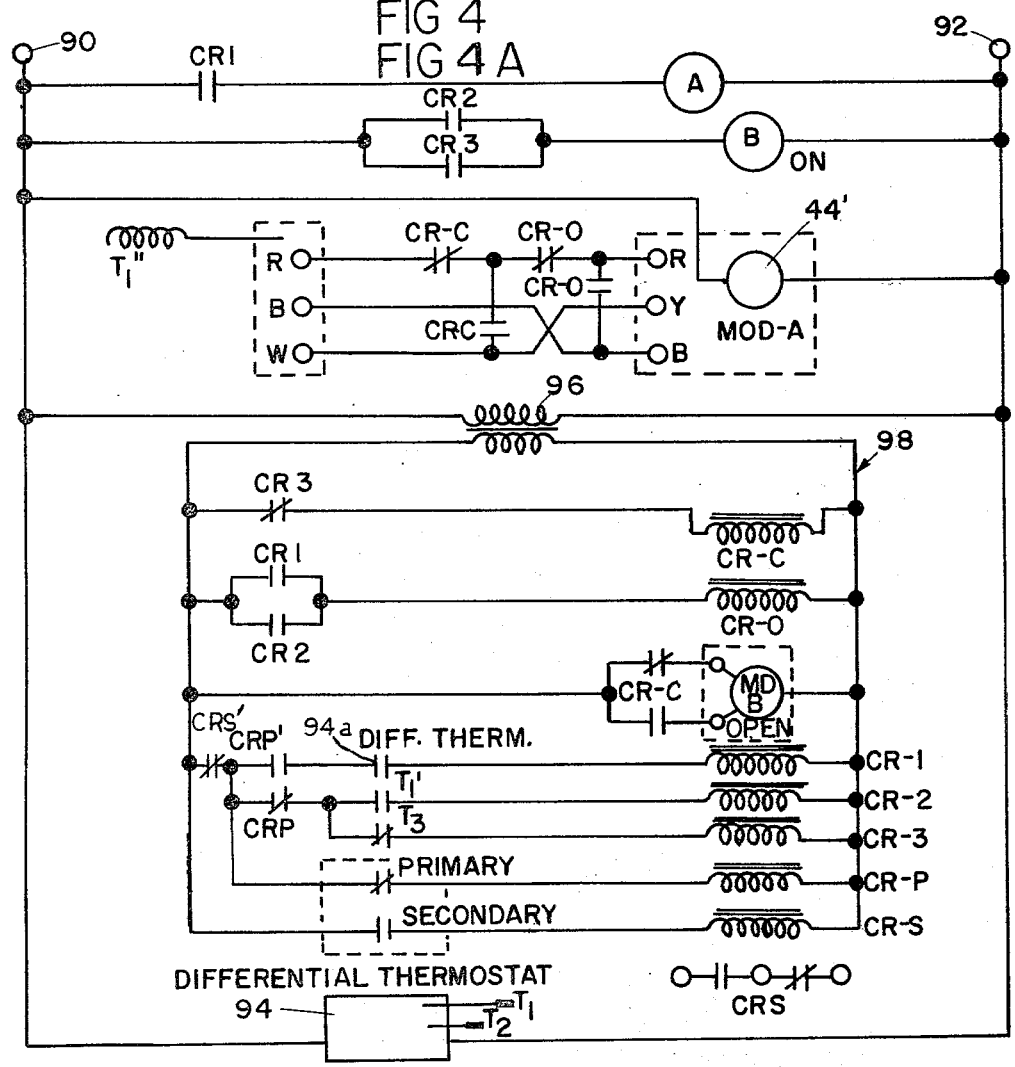

SOLAR HEAT SYSTEM

BACKGROUND OF THE INVENTION

This invention relates to a solar air heating system.

In copending applications Ser. No. 866,546 now U.S. Pat. No. 4,203,424 issued May 20, 1980 and Ser. No. 866,545 now U.S. Pat. No. 4,201,192 issued May 6, 1980, assigned to the assignee herein are disclosed solar air heating systems capable of retrieving available heat energy from a solar collector for combining with heat from a storage unit. In the apparatus of Ser. No. 866,546, when heated air is circulated from only the collector to the space to be heated, one blower is functional; and when air is circulated from both the collector and from the storage unit to the space, two parallel blowers are employed to propel air into a common mixing chamber and then through a common duct to the space. If, therefore, the first blower is sized for optimum flow through the chamber and duct to the space, the greater flow from both blowers will not be optimum for the duct system. On the other hand, if the duct system is optimized for both blowers operating, the flow from only one blower will not be optimum. In the apparatus of Ser. No. 866,545, one blower propels air from the collector to the storage unit, and if the space requires heat, air is pulled off the top of the storage unit to the space by another blower in series with the first, both being operational simultaneously. If heated air is taken from the collector simultaneously with heated air transfer from the storage to the space, the two blowers are preset to be in balanced relationship with each other. This balanced flow likely is not at optimum flow conditions through the duct system to the space. Such conditions above stated can fail to comply with recent HVAC and ASHRE specifications.

In either of the above systems, when heated air is removed from the collector and air is also supplied to the space, two blowers are operating simultaneously to require double power input.

SUMMARY OF THE INVENTION

The present invention salvages available heat generated in the collector and combines this efficiently with heat from the storage unit, to mix and propel such, using one blower sized to maximum efficiency for the ductwork from the mixing chamber to the environmental space to be heated. The same blower is functional whether heat is drawn only from the collector, only from the storage unit, or both, and transferred to the space.

The system furthermore allows full heat to be drawn simultaneously from both the collector and from the storage, even when both are up to temperature, to minimize blower operating time by rapid satisfaction of the heat requirements of the space. Moreover, the system is still capable of drawing off whatever heat is available in the collector, even if it is not itself capable of supplying the full heat required for the space.

In this system, a first blower and damper causes flow from either the collector or the storage unit, or both, to the space. A second blower and damper causes flow from the collector to the storage unit when heat is generated in the collector but not needed by the space. When heated air is drawn from both the collector and the storage, a modulated damper controls the amount of heated air from the collector in proportion to the heat there available, for mixing with heat from the storage.

These and several other features, objects, and advantages will be apparent from a review of the following detailed description.

BRIEF DESCRIPTION OF THE DRAWINGS

FIG. 1 is a schematic elevational view of the combination of this invention, showing the mode of operation with heated air flow from the collector to storage;

FIG. 1A is an electrical diagram of the system during the mode of FIG. 1;

FIG. 2 is a schematic elevational view of the combination in FIG. 1, showing the mode of operation with heated air flow from the collector to the environmental space to be heated;

FIG. 2A is the electrical diagram of FIG. 1A during the mode of FIG. 2;

FIG. 4 is a schematic elevational view of the apparatus in FIGS. 1–3, showing the mode with flow from both the storage and the collector, mixed in the control chamber and propelled to the space; and FIG. 4A depicts the electrical diagram of FIG. 1A during the mode of FIG. 4.

DESCRIPTION OF THE PREFERRED EMBODIMENT

Figure 3:
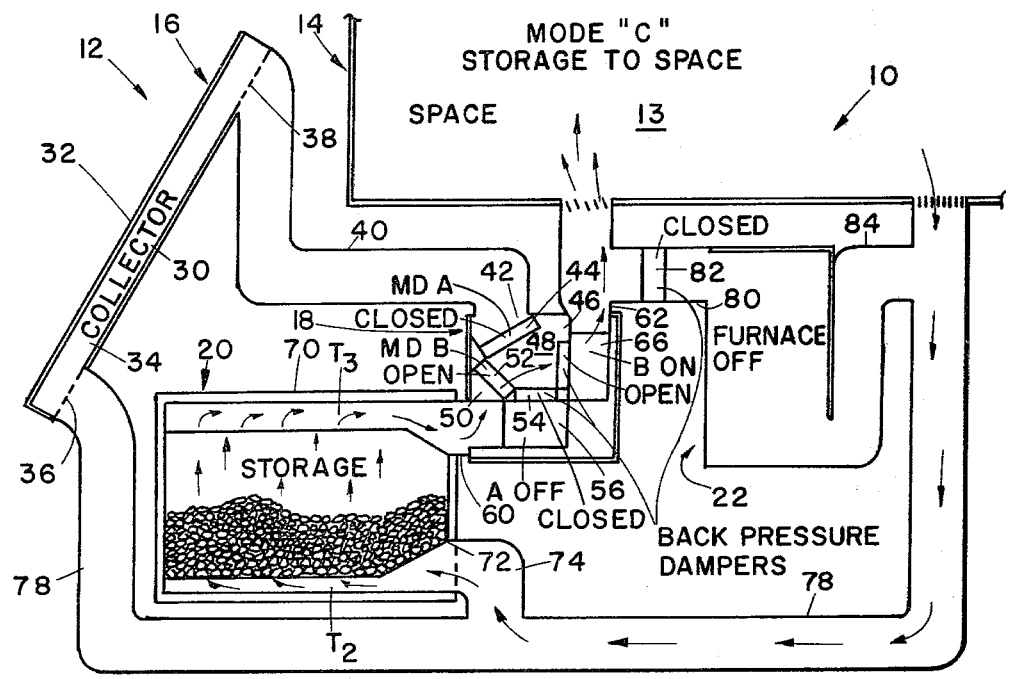
FIG. 3 is a schematic elevational view of the apparatus in FIGS. 1 and 2, showing the mode of operation with heated air flow from the storage to the space.

Referring now specifically to the drawings, the complete assembly 10 comprises a solar heating system 12 for accommodating an environmental space 13 within a space enclosure 14. The heating system depicted incorporates a solar collector 16, a flow control subassembly 18, a storage unit 20, and an auxiliary heat source 22.

Solar collector 16 may comprise any of many typical collectors having a dark, usually black, heat collector surface or surfaces shown here as a simple back panel 30, and a translucent front panel 32 spaced therefrom, both typically mounted on an angle, in generally vertical orientation, to be directed toward the sun. The intermediate air flow space 34 has a lower air flow inlet 36 to the low temperature, i.e. low energy portion of the collector, and an upper air flow outlet 38 at the higher temperature, i.e. higher energy portion. A duct 40 extends from collector outlet port 38 to the flow control subassembly 18. The port 42 serving as the inlet from this duct to the flow control housing 46 is controlled by a motor operated modulated damper 44. This damper can be opened varying amounts between fully closed and fully open position by electrical motor 44' (FIG. 1A). Motor 44' can for example be of the commercially available type designated "Honeywell" model M934A. It is governed by a temperature responsive proportional controller 49 of the type such as commercially available motor controller designated "Honeywell" model T991A. The controller can cause the modulated damper to vary in position in response to the temperature of the collector output. For example, it can be preset to cause the damper to vary in position over a 30° temperature range. At a temperature at the upper end of that range, or higher temperatures, the damper will be fully open. At a temperature at the lower end of that range, or lower temperatures, the damper will be fully closed.

Flow control housing 46 has a central chamber 48. It is connected by port 42 to duct 40 leading from the solar collector. It is in flow communication to storage 20 by a port 50 controlled by a motor operated damper 52. It is also in flow communication to storage 20 through a back pressure damper 54 in series with a motor operated blower 56. Blower 56 is arranged to draw air from chamber 48 past damper 54 and propel it to duct 60 leading to the top of storage chamber 20. Chamber 48 is communicable with duct 62 leading to space 13 through a back pressure damper 64 in series with a motor operated blower 66 which draws air from the chamber and through damper 64 and propels it to the space.

Storage unit 20 may comprise any suitable enlarged housing 70 containing a heat sink material 72 such as rocks. As noted, duct 60 communicates with this storage chamber at the top thereof. Another duct 74 communicates with this storage chamber at the bottom, such that air flow between the two ducts must be through the heat sink rocks. Duct 74 preferably extends along the entire bottom of the heat sink material for relatively uniform flow through the entire heat sink. Duct 74 leads into another duct 78 which extends from space 13 at one end to the collector at the other end.

Auxiliary heat source 22 may comprise a typical fossil fuel burning furnace or the equivalent, having an outlet duct 80 with a back pressure damper 82 therein, and communicant with duct 62 that leads to space 13. The intake duct 84 to this furnace may extend off duct 78 as depicted.

This construction enables salvaging of heat generated in the collector and efficiently combining this with heat from the storage unit, mixing the heated air from both in chamber 48 and propelling the mixture to the space 13 with just one blower 66. This blower therefore can be sized for optimum flow in the ductwork 62 from mixing chamber 48 to space 13 to be heated. As will be noted from the detailed description hereafter, this same motor operated blower 66 is the only source of propulsion whether heat is drawn only from the collector, only from the storage unit, or both, and transferred to space 13. The second blower 56, when activated, with its control damper, by itself causes flow from the collector to the storage unit when heat is generated in the collector but not needed by the space. Each of these two blowers can thus be preset to optimum flow conditions from chamber 48 to the respective ductwork.

In FIG. 1A is shown circuitry for this apparatus, connected to a power supply (not shown) through a pair of bus lines 90 and 92. Motor A operates blower 56. Motor B operates blower 66. Motor A is controlled through relay contacts CR1 from relay CR-1. Motor B is controlled through relay contacts CR2 and CR3, in parallel with each other, controlled by relays CR-2 and CR-3. Modulated damper 44 is rotated controlled amounts by electric motor 44' controlled by controller 49 through bridge circuit 45. The connection of the bridge circuit to the motor is at terminals R, Y and B and connected to the temperature sensor T1″ control at terminals R, B and W. Energizing of relay CR-C shifts contacts CRC and CRC′ to place the modulated damper motor 44' in the modulation mode through the bridge circuit. The circuit also includes a differential thermostat 94 of conventional type which contains the set of contacts 94a, e.g. as marketed under "Honeywell" or "Rho Sigma" trademarks, and a transformer 96 powering the relay subcircuit 98.

This subcircuit includes relays CR-B, CR-C, CR-0, the modulated damper motor 52', and relays CR-1, CR-2, CR-3, CR-P, and CR-S. It also includes sets of electrical contacts T1′ of the remote bulb temperature sensor T1′ at the high energy output end of the collector, contacts T2 operated by temperature sensor T2 at the low energy, i.e. bottom portion of the storage unit and electrical contacts T3 of the remote bulb temperature sensor T3 at the top high energy portion of the storage unit. There are actually three temperature sensors at the top of the collector, namely sensor T1 that forms part of the differential thermostat 94, sensor T1′ which preferably comprises a remote bulb detector and controls contacts T1′ in subcircuit 98, and sensor T1″ which preferably comprises a remote bulb sensor forming part of the controller 49.

A thermostat 47, e.g. a wall thermostat, positioned in the space 13 to be heated, has a set of primary contacts and a set of secondary contacts as depicted e.g. on FIG. 1A. The primary contacts can be preset to be actuated at a desired minimum room temperature such as 68° F. at which the system is activated as explained hereinafter to supply solar heated air to the space 13. The secondary contacts can be preset to close at a lower temperature such as 62° F. to activate the auxiliary heat source 22 as explained hereinafter, in the event there is inadequate generated and/or stored solar energy.

In mode A depicted in FIG. 1, solar energy is being collected at the collector but is not needed by the environmental space 13. The normally closed relay contacts CRP are closed, indicating that space 13 is not requiring heat. If the differential thermostat senses that the temperature at T1, i.e. the high energy side of the collector, is higher than the temperature T2 at the low energy side of the storage unit, it would be advantageous to propel air from the collector to storage. When both of these conditions exist, relay CR-1 is energized which energizes relay CR-0 to close contacts CR0′ and energize blower motor A for blower 56. When relay CR-0 is energized, it not only closes normally open contacts CR-0 but also opens normally closed contacts CR-0′ to drive the modulated damper 44 to its full open position.

If space 13 should then call for heat, primary contacts of thermostat 47 close to energize relay CR-P to open the normally closed contacts CRP′ in series with relay CR-1 or if the furnace heat is necessary, the secondary contacts of thermostat 47 close to energize relay CR-S to open normally closed contacts CRS in series with relay CR-1. Either of these would override this first operational mode A and prevent blower motor A from operating to thereby allow the collector to stagnate and reach a temperature more readily usable instead of prematurely cooling the collector by attempting to heat the cool rock mass of the storage unit. Operation of the thermostat 47 would indicate colder weather during which this would occur. If the storage cold side temperature as detected at sensor T2 should come close to, i.e. within a few degrees of the temperature of the collector output, this mode would also terminate by operation of differential thermostat 94.

Mode B operation involves flow from the collector to the space as depicted in FIG. 2. In this mode of operation, solar energy is available in the collector and is used directly in space 13. To activate this mode, several conditions must exist. Primarily, the space must call for heat by activation of thermostat 47. The primary contacts are thus closed to energize relay CR-P which closes normally open contacts CRP and, if remote bulb sensor T1′ detects that the collector temperature is greater than the predetermined set point of the remote bulb controller, the two contacts in series with relay CR-2 are closed to energize blower motor B and to energize relay CR-0 which closes contacts CR0 to modulated damper motor 44' to drive it to the full open position.

It is possible that when mode B is activated, damper 44 could already have been open if the system is cycling back and forth between mode A and mode B as occurs when the space and the rocks of the storage are alternately being heated.

If sensor T1' should indicate a temperature below the controller set point, or the space thermostat becomes satisfied and opens, mode B will terminate.

The system can also cycle between mode A override and mode B under the following conditions. If the secondary contacts of the wall thermostat 47 energize furnace 22, by shifting contacts CRS and CRS', this also de-energizes relay CR-P and relay CR-2 to allow the collector to stagnate between attempts to heat the space 13. When the secondary contacts close, this indicates the solar system is unable to cope with the heat load required. When the back-up furnace has supplied the heat required and shuts off, the solar collector is given further opportunity to bring the temperature up to the preset temperature setting on controller 51 which sensor T1' must match to enable heat to be drawn from the collector.

In FIG. 3 is a shown mode C wherein flow occurs from the storage to the environmental space. In this mode of operation, usable energy is transferred into space 13 by passing return air through the storage and circulating the heated air therefrom through the environmental space. Several conditions must exist to activate this mode. Primarily the system during this mode is very similar as during mode B depicted in FIG. 2, except that control sensor T3 activates relay CR-3, the contacts CR3 then activating relay CR-B to operate contacts CRB and cause the damper motor 52' to open damper 52. To activate this mode, the wall thermostat 47 first calls for heat by closing the primary contacts and activating relay CR-P. Further, sensor T3 remote bulb thermostat indicates that the top high temperature side of storage is higher in temperature than the set point of the controller 53. Relay CR-P and sensor T3 thereby energize relay CR-3 which energizes blower B and through energized contacts CRB energizes motorized damper 52'. Flow then occurs from the storage space through damper 52 to chamber 48, thence through back pressure damper 64 and blower 66 through duct 62 to space 13 to heat it, and return through duct 78 and duct 74 to the cooler underside of the storage chamber.

In the event that solar energy is not available at the collector and no heat or insufficient heat is collected in the storage, and yet space 13 calls for heat, the auxiliary heat source or furnace 22 is activated by closing of the secondary contacts in the wall thermostat 47 to shut down the solar system in lieu of the back-up system. The furnace is activated by the normally open secondary contacts CRS (of relay CR-S) that are not connected into the control circuit for the solar unit. Herein this is designated mode D.

Mode E in the novel system constitutes an inactive state as to the solar collector and the auxiliary furnace, as during the hot summertime. Under these conditions a vent (not shown) from the collector is simply opened to prevent overheating.

In FIG 4 is depicted the system in mode F wherein heated air is drawn from the storage unit and from the collector, mixed in chamber 48, and then propelled to space 13. The amount of flow from the collector is proportional to the temperature at the high energy end of the collector for maximizing heat savings and usage. I.e., if the collector is only accumulating a small proportion of the heat required by the environmental space, as indicated by the temperature at sensor T1'', the flow through and from the collector is modulated by damper 44 to be proportional thereto, with the remainder of the required heat being drawn from the storage. However, if the collector is capable of providing more of the heat required by the house, the modulated damper 44' opens further (in proportion to increase) satisfying 47 sooner and reducing draw from storage. The total air flow increases. Storage air flow does not decrease appreciably. This is accomplished when the modulation control sensor at T1'' senses energy, i.e. temperature, within the selected range (typically plus or minus 15° F. of a set point) and opens the modulated damper A in proportion to the sensed temperature. This is regulated by a bridge circuit 45 between the control 49 and the damper motor 44' connected to the control at terminals R, B and W and to the motor at terminals R, Y and B. Relay CR-C is thus energized to place modulated damper motor 44' in the modulation mode. If the space 13 calls for heat and the remote bulb sensor T1 is satisfied (comparable to conditions at mode B, FIG. 2), and the remote bulb sensor at T3 is satisfied (as at mode C, FIG. 3), blower B is activated to pull heated air from both the storage and the collector simultaneously to cause them to flow into chamber 48 and mix. If the temperature at sensor T1'' decreases below the set point, it will fall within the range of mode F and the modulated damper A will regulate the flow from the collector to accommodate the lower air temperature.

It is conceivable that variations could be made to the specific embodiment described for the inventive concept set forth to suit a particular installation.

The embodiments of the invention in which an exclusive property or privilege is claimed are defined as follows:

1. A solar air heating system comprising a collector and a storage unit for a space to be heated;

air propulsion and flow control apparatus comprising a chamber having a first port to be communicant with said space, a second port to be communicant with said storage unit and a third port to be communicant with said collector; a first propulsion unit and a first flow control valve for flow from said chamber to said space, a second propulsion unit and a second flow control valve for flow from said chamber to said storage unit, a third flow control valve for flow from said collector to said chamber, and a fourth flow control valve for flow from said storage unit to said chamber; said first propulsion unit constituting the sole propulsion source for air propelled from said collector and/or said storage unit through said chamber to said space; control means for said apparatus (a) for opening said third valve and activating said first propulsion unit for flow from said collector to said chamber to said space, (b) for opening said third valve and activating said second propulsion unit for flow from said collector to said chamber to said storage, (c) for opening said fourth valve and operating said first propulsion unit for flow from said storage to said chamber to said space, and (d) for opening said third valve and said fourth valve and activating said first propulsion unit for flow from said collector to said chamber and from said storage to said chamber for mixing and flow to said space.

2. The system in claim 1 wherein said third flow control valve is variable to proportion flow from said collector relative to flow from said storage under stage (d).

3. The system in claim 2 including a temperature responsive proportional controller for regulating said third flow control valve.

4. A solar air system comprising a collector and a storage unit for a space to be heated;

air propulsion and flow control apparatus comprising a chamber having a first port to be communicant with said space, a second port to be communicant with said storage unit and a third port to be communicant with said collector; a first propulsion unit for flow from said chamber to said space, a second propulsion unit for flow from said chamber to said storage unit, said first propulsion unit constituting the sole propulsion source for air propelled from said collector and/or said storage unit through said chamber to said space; temperature sensing means at said collector, said storage, and said space for sensing temperatures thereat; control means for said apparatus responsive to said temperature sensing means for selectivity causing (a) flow from said collector to said chamber to said space, (b) flow from said collector to said chamber to said storage, (c) flow from said storage to said chamber to said space, and (d) flow from said collector to said chamber and from said storage to said chamber, to said space, in response to heat requirements of said space and heat supply in said collector and storage.

5. In a solar air system comprising a collector; a storage unit; and a space to be heated;

air propulsion and flow control apparatus comprising a chamber having a first port to be communicant with said space, a second port to be communicant with said storage unit and a third port to be communicant with said collector; a first propulsion unit and a first flow control valve for flow from said chamber to said space, a second propulsion unit and a second flow control valve for flow from said chamber to said storage unit, a third flow control valve for flow from said collector to said chamber, a fourth flow control valve for flow from said storage unit to said chamber; said first propulsion unit constituting the sole propulsion source for air propelled to said space from said collector and/or said storage unit through said chamber to said space; including a collector temperature sensor, a storage temperature sensor, and a space temperature sensor; control means for said apparatus responsive to said storage temperature sensor, to said collector temperature sensor and to said space temperature sensor (a) for opening said third valve and activating said first propulsion unit for flow from said collector to said chamber to said space, (b) for opening said third valve and activating said second propulsion unit for flow from said collector to said chamber to said storage, (c) for opening said fourth valve and operating said first propulsion unit for flow from said storage to said chamber to said space, and (d) for opening said third valve and said fourth valve and activating said first propulsion unit for simultaneous flow from said collector to said chamber and from said storage to said chamber, for mixed flow to said space.

6. The solar air system in claim 5 wherein said control means includes a temperature responsive proportional controller operably connected with temperature sensing means for proportioning the flow from said collector and from said storage, to said chamber.

* * * * *